Patented July 24, 1923.

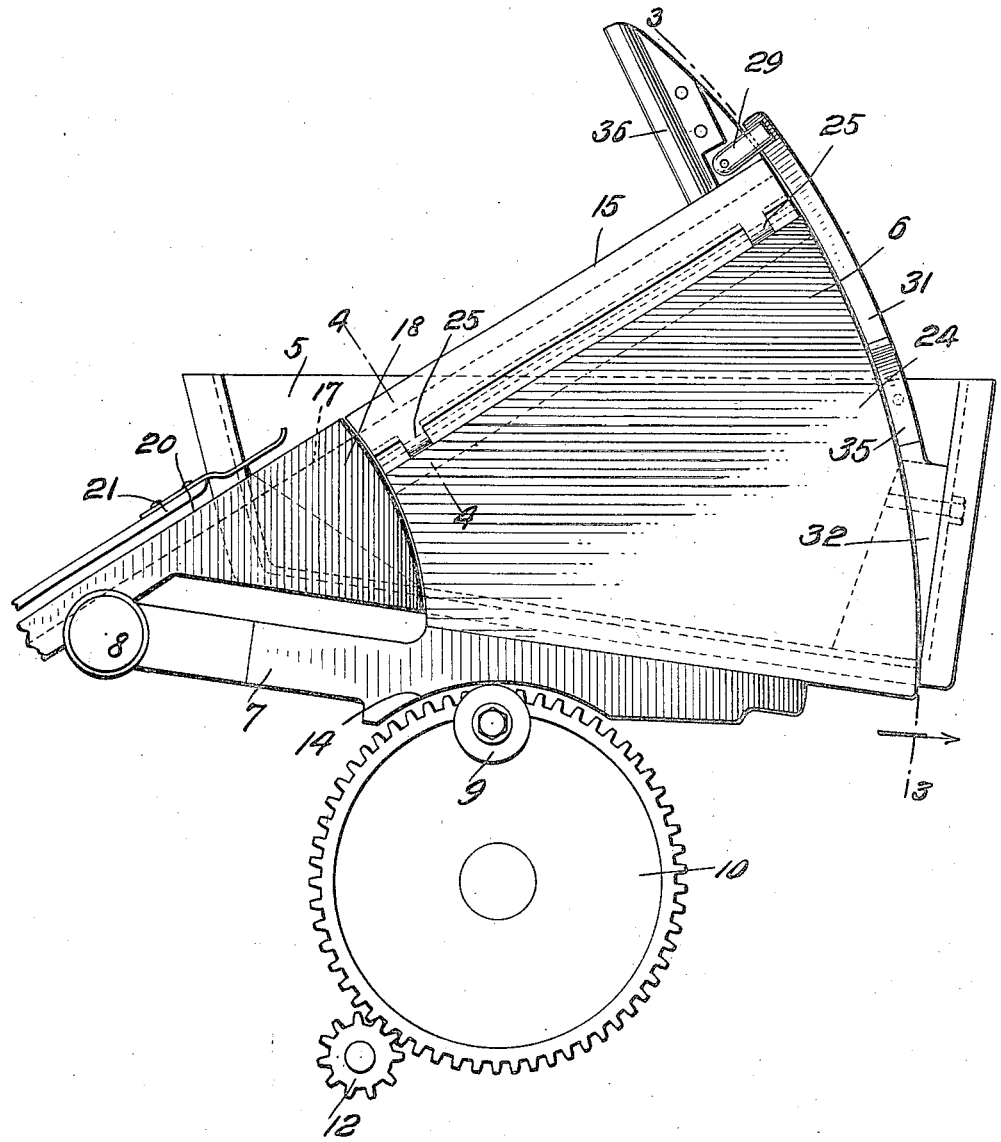

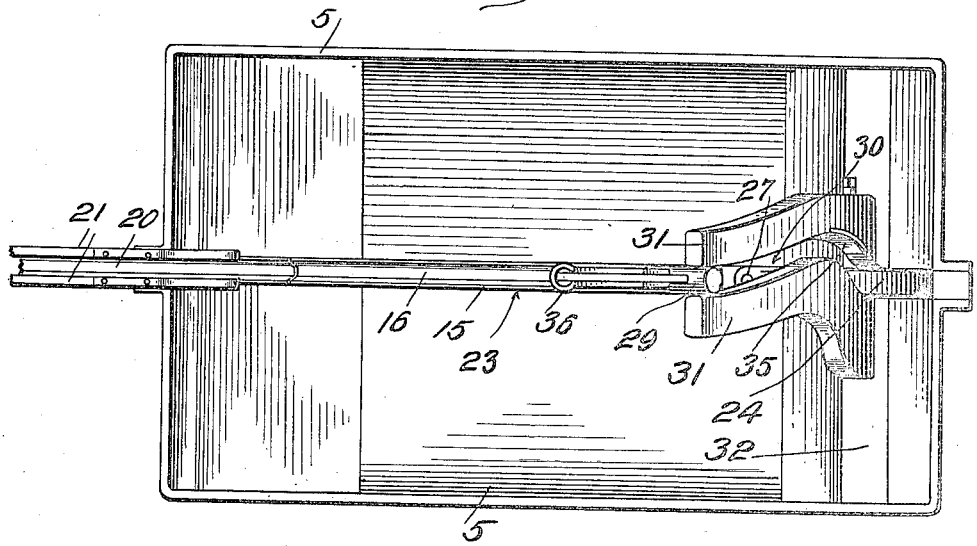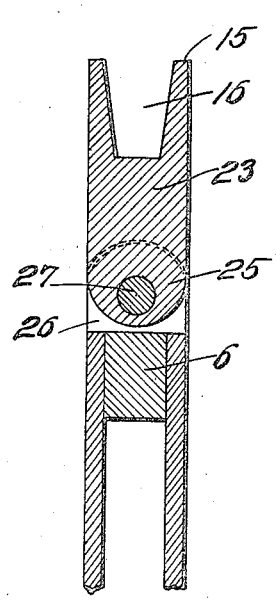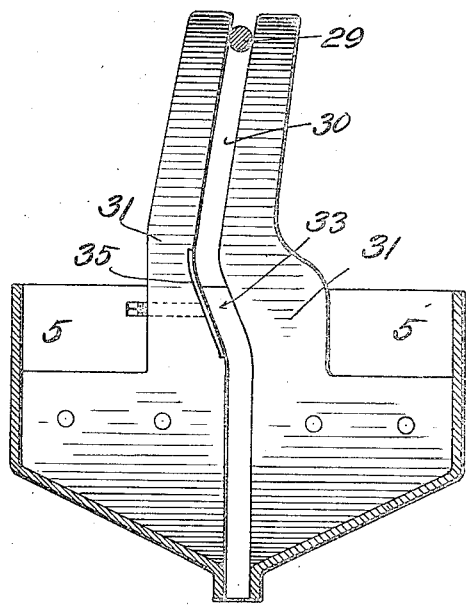

1,462,629

UNITED STATES PATENT OFFICE.

RICHARD WHITAKER, JR., AND WILLIAM H. SNYDER, OF NEW BRUNSWICK, NEW JERSEY, ASSIGNORS TO BRYDEN-NEVERSLIP COMPANY, OF NEW BRUNSWICK, NEW JERSEY, A CORPORATION OF NEW JERSEY.

FEEDING MECHANISM.

Application filed March 7, 1922. Serial No. 541,691.

*To all whom it may concern:*

Be it known that we, RICHARD WHITAKER, Jr., and WILLIAM H. SNYDER, citizens of the United States, residing at New Brunswick, in the county of Middlesex and State of New Jersey, have invented new and useful Improvements in Feeding Mechanism, of which the following is a specification.

The invention relates to an improvement in feeding mechanism for feeding a series of headed articles, such as bolts, nuts, horseshoe calks and the like, to a machine adapted to perform one or more operations upon the articles.

The feeding mechanism of the present invention is of the type wherein a vertically reciprocating plate or feeder having a groove in its upper edge rises through the articles contained in a hopper and thereby picks up one or more of the articles which it delivers to a chute leading to the machine adapted to operate upon the articles. When the feeder is in delivering position the articles slide down the groove into the chute. Occasionally, however, owing to the fact that an article is misplaced on the feeder, the feed of the articles to the machine is interrupted, so that the operating parts of the machine come together without an article between them. Sometimes this condition persists for several reciprocations of the feeder. This results in considerable damage to the machine parts operating upon the articles.

The object of the present invention is to provide a feeding mechanism of the above described type which means whereby it is substantially impossible for misplaced articles to remain on the feeder, so that there will be a constant and uninterrupted feed of the articles to the machine with which the feeding mechanism is connected. With this object in view the invention consists in the improved mechanism described in the following specification and particularly pointed out in the appended claims.

The preferred form of the invention is illustrated in the accompanying drawings in which Fig. 1 is a side elevation of the improved feeding mechanism; Fig. 2 is a top plan of the parts shown in Fig. 1; Fig. 3 is a sectional view taken on the line 3—3 of Fig. 1, looking in the direction of the arrow; and Fig. 4 is a section, on an enlarged scale, taken on the line 4—4 of Fig. 1.

The improved feeding mechanism, as illustrated in the drawings, comprises a hopper 5 for containing the articles to be fed or delivered to the machine for operating upon them. The machine adapted to perform the desired operations on the articles constitutes no part of the present invention and so is not shown. This type of feeding mechanism is commonly used in connection with trimming machines, and the articles fed to the trimming machine are usually bolts, nuts, horseshoe calks or other articles having a shank portion and a head. The invention, however, is not to be restricted to feeding any particular kind or shape of article within the range of articles it is adapted to feed. For purposes of description, it is assumed that the feeding mechanism is employed for feeding bolts to a trimming machine.

During the operation of the trimming macine, the hopper 5 is kept substantially half full of bolts. The bolts are lifted out of the hopper and fed to the trimming machine by means of a plate or feeder 6 which is arranged to have vertically reciprocating movements and for this purpose is supported on an arm 7 which is pivotally mounted at 8. The arm 7 is oscillated in a vertical plane by means of a roll 9 mounted on a gear 10 driven by a pinion 12. To accommodate the roll 9 the arm 7 is provided with a cam surface 14. The arm 7 is lifted by the roll 9 and falls by force of gravity.

The feeder 6 rises through a slot formed longitudinally in the bottom of the hopper 5. The upper edge or surface 15 of the feeder 6 is provided with a groove 16 which is adapted to pick up the bolts contained in the hopper as the feeder rises through them. When the feeder has risen to the full extent of its upward movement the surface 15 forms an inclined plane and the groove 16 registers with a corresponding groove 17 formed in the upper edge of a chute 18. The chute 18 is a fixed structure which projects at its upper end into the hopper and terminates at its lower end adjacent the trimming machine. The upper edge 20 of the chute is in the same plane with the edge 15 of the feeder when the latter is in its bolt delivering position, so that the bolts which are properly caught up in the groove 16 by the feeder during its upward movement slide down the surface 15 onto the surface 20 and into the trimming machine. To prevent the bolts from jumping out of the groove 17 a bifurcated guard 21 is provided.

In order that the bolts may be delivered into the groove 17 of the chute 18 so that the bolt heads will pass under the guard 21 it is necessary that the bolt heads rest upon the upper edges 15 of the feeder and that the shanks of the bolts project into the groove 16. It is obvious, however, with the bolts lying in the hopper in topsy turvy positions, that when the groove 16 has emerged from the mass of bolts the bolts will be on the feeder in various positions. Sometimes one or more bolts will be properly positioned with the heads resting on the edges 15 and the shanks projecting into the groove 16. Sometimes one or more bolts will be so caught up that the heads will be partly in the groove and the shanks projecting therefrom. And sometimes one or more bolts will rest entirely on the upper edges 15, not infrequently extending transversely across the edges. When the bolts assume this latter position and slide down onto the chute they impede the passage of the bolts which are properly positioned in the groove. This condition often lasts during several reciprocations of the feeder, during which time the bolts in the chute have been delivered into the trimming machine, and for a period the operating parts of the trimmer come together with no bolt between them, thereby causing unnecessary wear on the trimmers or other parts which operate on the bolts or other articles.

In order to insure that all the bolts or other articles will be in proper position on the feeder before they slide down onto the chute, the feeding mechanism of the present invention is provided with means for removing from the feeder all improperly positioned bolts or other articles. This is accomplished by imparting to the bolt carrying part a vibratory movement as the feeder is rising into bolt delivering position. The vibration of the bolt carrying part of the feeder causes all bolts or other articles, whose heads are not on the edges 15 with their shanks projecting into the groove 16, to be thrown off the feeder and back into the hopper. The vibration is caused by imparting a lateral movement to the bolt carrying part of the feeder. To permit the bolt carrying part 23 to vibrate (this part comprising the edges 15 and the groove 16), it is hinged to the body part 24 of the feeder by means of lugs 25 which are received in corresponding recesses 26 in the body part. A rod 27 loosely connects the bolt carrying part 23 with the body part 24. Secured to a projection rising from the rear end of the bolt carrying part of the feeder is a pin 29 which, when the feeder rises and falls, travels in a cam path formed in a curved plate 31 rising from a base 32 bolted in the rear end of the hopper. The cam path 30 is provided with a double bend 33 which imparts to the bolt carrying part of the feeder the lateral or vibratory movement which throws off the improperly positioned bolts. The double bend 33 of the cam path is so located that the vibratory movement is imparted to the bolt carrying part of the feeder immediately after it leaves the mass of bolts so that it has returned to normal when the feeder reaches its bolt delivering position. At the point in the double bend 23 where the greatest wear comes a wear plate 35 is provided. In order that no bolts may fall into the cam path 30, the rear end of the bolt carrying part of the feeder is provided with a guard 36.

By providing the feeding mechanism with an article carrying part to which a lateral vibration or other movement is imparted, different and distinct from the movement which bring the articles into delivery position, all articles which are not properly positioned on the article carrying part are displaced and thrown back into the hopper, and the result is that there is unbroken and uninterrupted series of articles passing from the hopper down the chute and into the machine with which the feeding mechanism is connected.

Having thus described the invention what we claim as new is:—

1. A feeding mechanism comprising a hopper, a vertically reciprocating feeder, means for actuating the feeder, and means for vibrating the article carrying part of the feeder during its reciprocating movements.

2. A feeding mechanism comprising a hopper, a pivoted feeder arranged to pass through a slot in the hopper, means for actuating the feeder, said feeder having a relatively movable part for carrying articles lifted out of the hopper, and means for vibrating the relatively movable part of the feeder.

3. A feeding mechanism comprising a hopper, a feeder arranged to rise vertically through the hopper, means for actuating the feeder, said feeder having a relatively movable article carrying part, a cam path, and connections between the relatively movable part of the feeder and the cam path for imparting a vibratory movement to the former.

4. A feeding mechanism comprising a hopper, a feeder adapted to rise through the hopper to take up articles contained therein, means for actuating the feeder, said feeder having a grooved article carrying part hinged to the body part of the feeder, and means for vibrating the grooved article carrying part to displace or throw off improperly positioned articles.

5. In a feeding mechanism comprising a hopper, a feeder adapted to rise through the hopper to take up articles contained therein and means for actuating the feeder, an article carrying part for said feeder relatively movable therewith, and means for vibrating said relatively movable part to displace or throw off any improperly positioned articles.

6. In a feeding mechanism comprising a hopper, a pivotally mounted feeder adapted to rise through the hopper to take up articles contained therein and means for actuating the feeder, an article carrying part for said feeder pivotally connected with the feeder, a cam path having a double bend portion, and a pin connected with the article carrying part of the feeder and arranged to travel in the cam path.

RICHARD WHITAKER, Jr.
WILLIAM H. SNYDER.